US005525793A

United States Patent [19]
Holmes et al.

[11] Patent Number: 5,525,793
[45] Date of Patent: Jun. 11, 1996

[54] OPTICAL HEAD HAVING AN IMAGING SENSOR FOR IMAGING AN OBJECT IN A FIELD OF VIEW AND A TRACKING SENSOR FOR TRACKING A STAR OFF AXIS TO THE FIELD OF VIEW OF THE IMAGING SENSOR

[75] Inventors: Alan W. Holmes; Matthew J. Longmire, both of Santa Barbara, Calif.

[73] Assignee: Santa Barbara Instrument Group, Santa Barbara, Calif.

[21] Appl. No.: 319,792

[22] Filed: Oct. 7, 1994

[51] Int. Cl.$^6$ ............................ G01C 21/02; G01C 21/24
[52] U.S. Cl. ........................... 250/203.6; 250/203.1; 250/206.2; 250/208.1; 250/208.2
[58] Field of Search ........................ 250/203.6, 203.4, 250/203.3, 203.1, 208.1, 206.1, 206.2, 561

[56] References Cited

U.S. PATENT DOCUMENTS

| | | | |
|---|---|---|---|
| 3,578,975 | 5/1971 | Wheeler | 250/203.1 |
| 4,283,112 | 8/1981 | Venable | 350/80 |
| 4,388,646 | 6/1983 | Strother | 358/160 |
| 4,448,500 | 5/1984 | Marling et al. | 350/574 |
| 4,651,001 | 3/1987 | Harada | 250/330 |
| 4,939,369 | 7/1990 | Elabd | 250/332 |
| 4,944,587 | 7/1990 | Harigae | 356/152 |
| 5,012,081 | 4/1991 | Jungwirth et al. | 250/203.6 |
| 5,065,029 | 11/1991 | Krivanek | 250/441.1 |
| 5,066,860 | 11/1991 | Zinner | 250/349 |
| 5,134,274 | 7/1992 | Poole et al. | 250/208.1 |
| 5,162,861 | 11/1992 | Tamburito et al. | 356/5 |
| 5,177,686 | 1/1993 | Böinghoff | 364/459 |
| 5,260,557 | 11/1993 | Kissh et al. | 250/203.6 |
| 5,300,781 | 4/1994 | Denney et al. | 250/342 |
| 5,341,435 | 8/1994 | Corbett et al. | 382/1 |
| 5,410,143 | 4/1995 | Jones | 250/206.1 |

OTHER PUBLICATIONS

Article entitled "A Versatile CCD For Amateurs" By Dennis di Cicco, pp. 250 Through 255, Sep. 1990, Sky And Telescope.
Sky and Telescope, Aug. 1994, pp. 130–131.
Article Entitled "CCD Test Report: SBIG's New ST–4X CCD Camera System By Dennis di Cicco", pp. 37 Through 41, Spring, 1994, CCD Astronomy.
Article Entitled "ST–6 CCD Imaging Camera" By Dennis di Cicco, pp. 395 Through 400, Oct., 1992, Sky And Telescope.
Pp. 55 and 56, Meade General Catalog, 1994 [ Meade Picture 216 CCD Auto Guider/Imager.

*Primary Examiner*—Edward P. Westin
*Assistant Examiner*—Stephen Calogero
*Attorney, Agent, or Firm*—Daniel J. Meaney, Jr.

[57] ABSTRACT

An optical head for attachment to an optical system, such as a telescope, is shown. The optical head in a housing includes a first sensor for imaging an object in a field of view and a second sensor for tracking a star or other celestial body which is off axis to the field of view of the first sensor. The second sensor is rigidly supported and positioned a selected distance from and adjacent to the first sensor and is adapted to generate correction signals which are used to control a drive system of the optical system or telescope. The correction signals are representative of desired changes in the relative position of the optical system or telescope to the star being tracked. The correction signals are applied to the drive system to maintain, during imaging, optical alignment of the first sensor with an object in the field of view. In the preferred embodiment, the optical head is used for astronomical imaging and tracking wherein the first sensor is an imaging CCD and the second sensor is a tracking CCD. A method for tracking and imaging for a telescope is also shown.

30 Claims, 4 Drawing Sheets

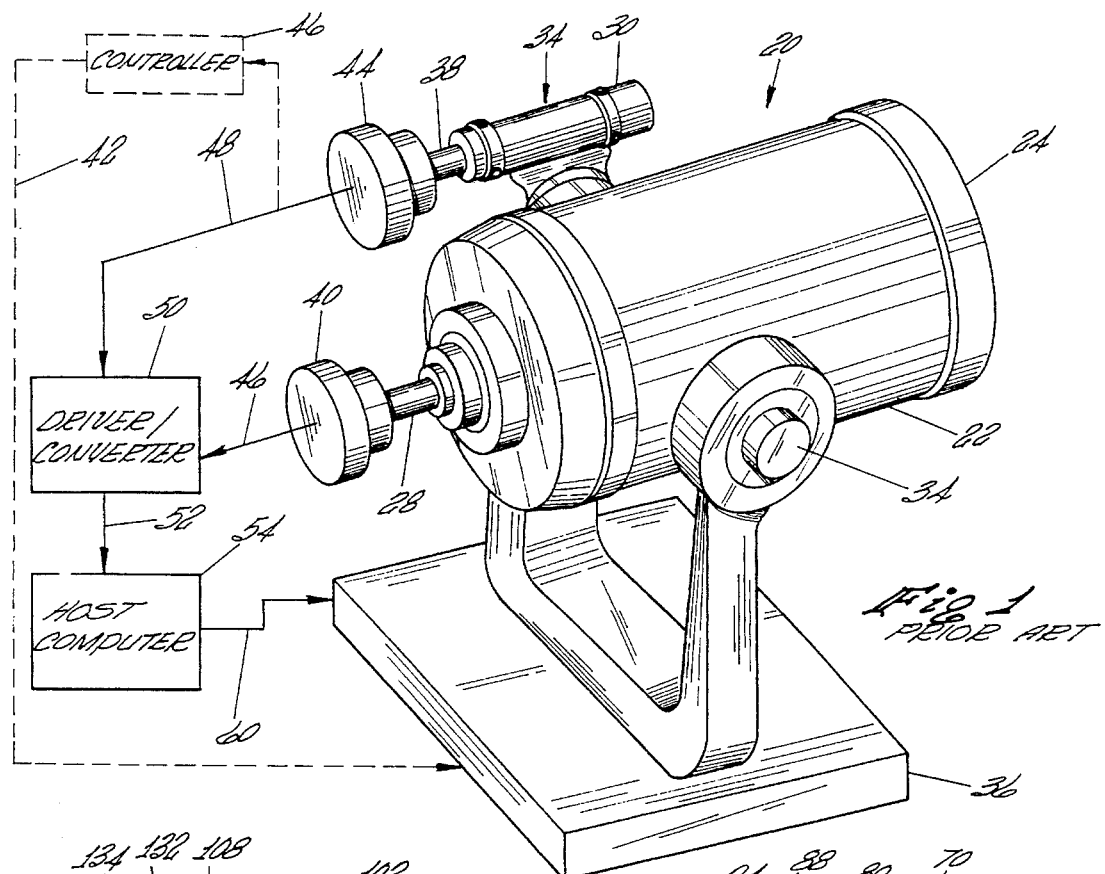
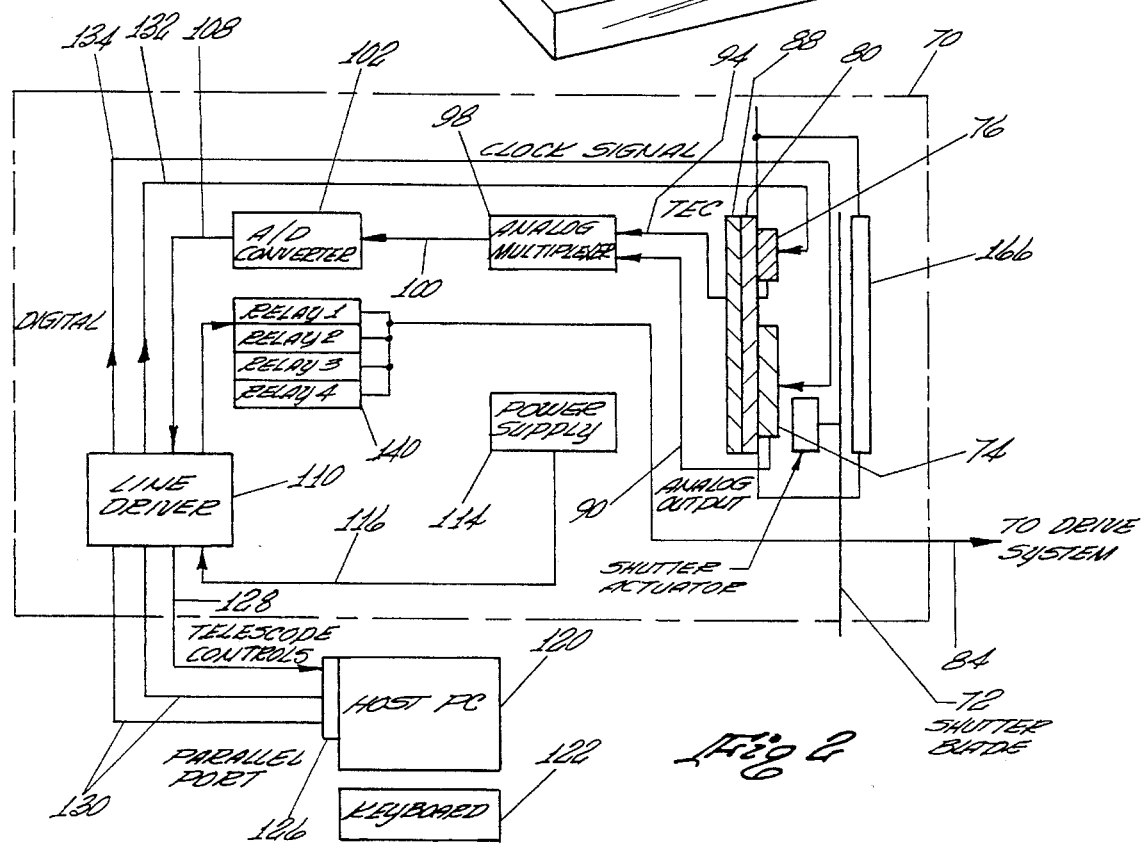

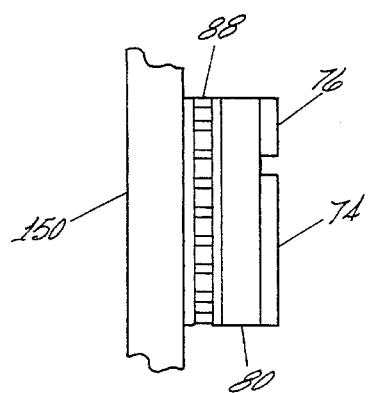
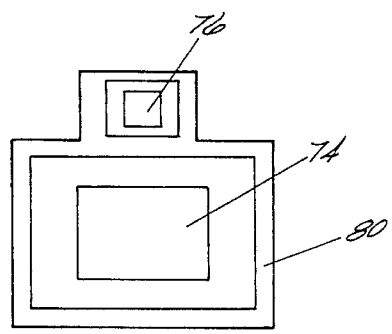
Fig 3  Fig 4
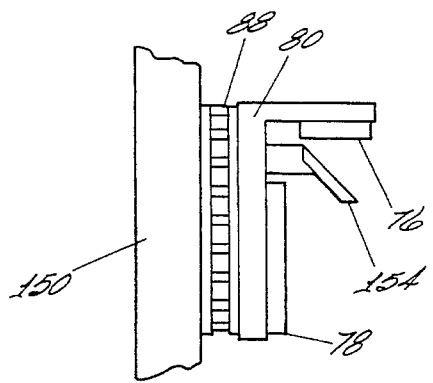
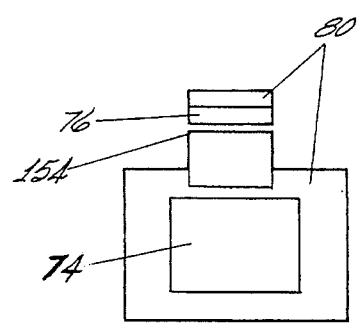
Fig 5  Fig 6
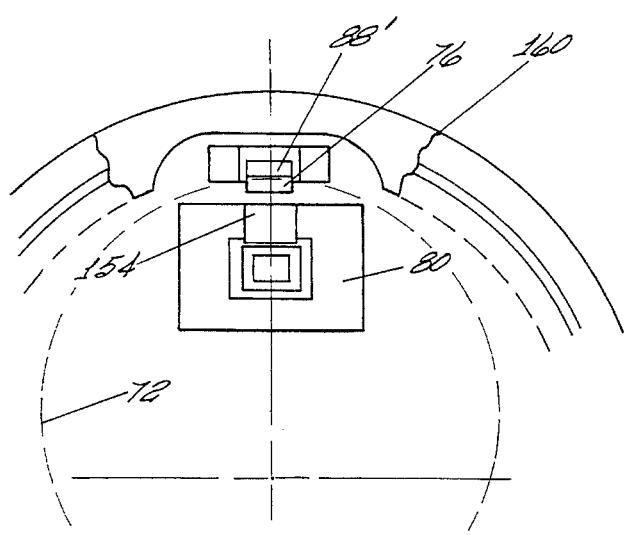
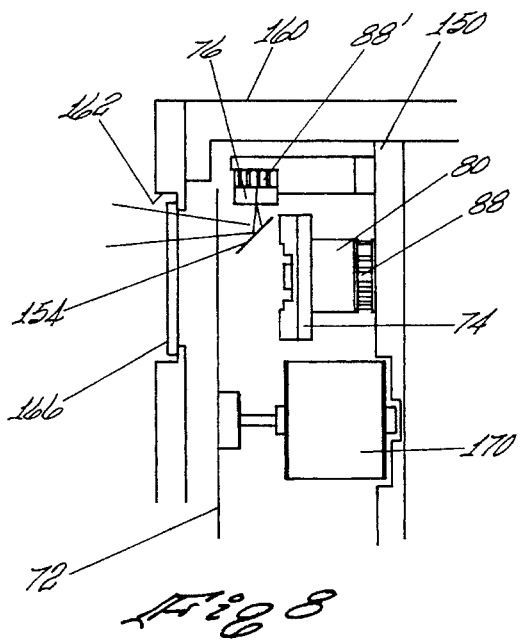
Fig 7  Fig 8

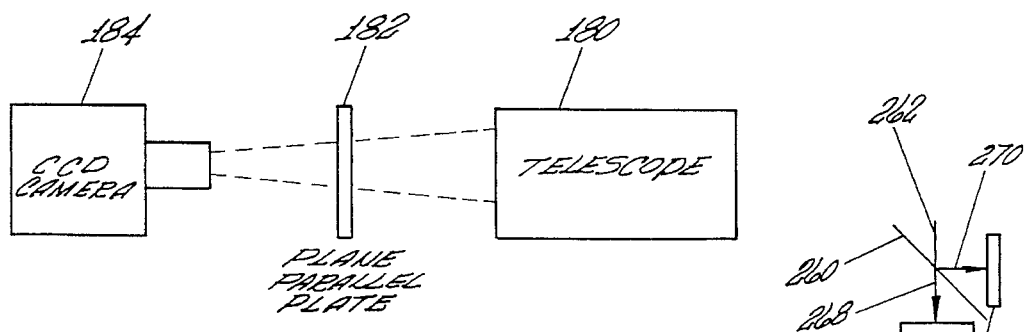
Fig 11
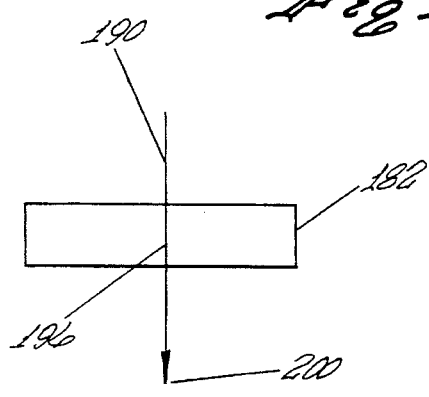
Fig 12 (a)
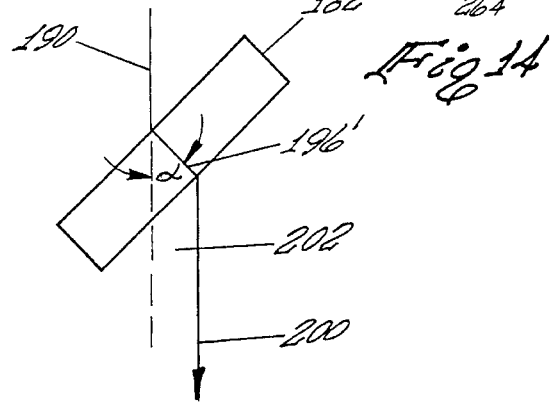
Fig 12(b)
Fig 14
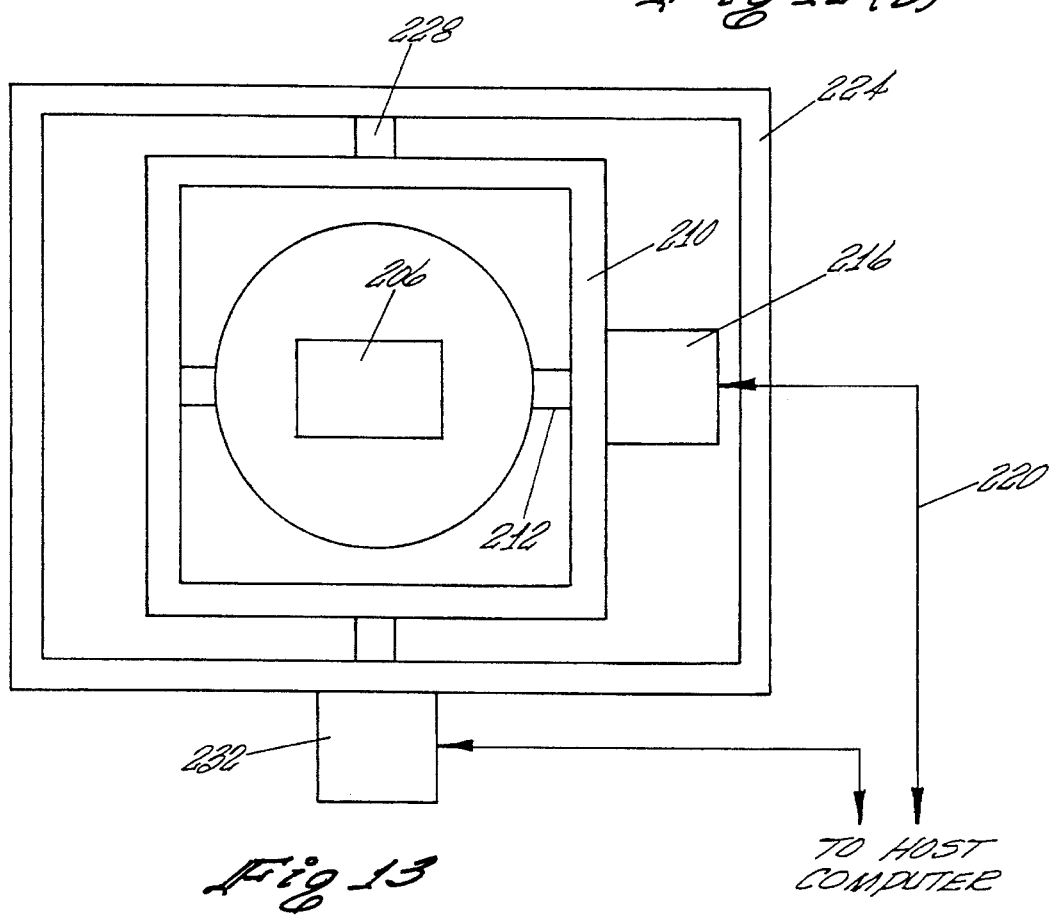
Fig 13

OPTICAL HEAD HAVING AN IMAGING SENSOR FOR IMAGING AN OBJECT IN A FIELD OF VIEW AND A TRACKING SENSOR FOR TRACKING A STAR OFF AXIS TO THE FIELD OF VIEW OF THE IMAGING SENSOR

BACKGROUND OF THE INVENTION

1. Field of the Invention

This invention relates to an optical head having an imaging sensor and a tracking sensor adapted for use with a telescope having a drive system for correcting telescope position and more particularly relates to an imaging and tracking apparatus for a telescope wherein the apparatus includes an imaging CCD for imaging an object in a field of view and a tracking CCD for tracking a star or other celestial body which, in the preferred embodiment, is off axis to the field of view. The apparatus generates correction signals representative of the relative position of the telescope to a star being tracked. The correction signals are applied to the drive system to make corrections to the telescope position so as to maintain telescope alignment during imaging with an object in a field of view.

2. Description of the Prior Art

Long exposure imaging of the night sky is a technique that has long been used by astronomers to reveal detail beyond the limits of human vision. This technique has traditionally been performed by placing photographic film at the prime focus of a telescope, which has a clock drive to compensate for the rotation of the earth. The camera formed thusly is manually corrected to follow the stars while the earth rotates to acquire a sharp image.

Use of Charged Coupled Device (CCD) Camera systems in the field of astronomy and general imaging is well known in the art.

In astronomical imaging, the CCD sensor is ideal for imaging small, faint objects in a field of view. The CCD sensor is able to provide long term exposure of an object to develop an image which can be processed electronically. A CCD sensor based camera system has several advantages over a film imaging system. A CCD sensor based camera system provides faster imaging speeds, quantitative accuracy, ability to increase contrast and subtract sky background with few key strokes on a host computer, the ability to co-add multiple images without tedious darkroom operations, a wider spectral range and instant examination of the images at the telescope.

In astronomical imaging, the basic function of a sensor, such as a CCD, for example, is to convert incoming photons of light to electrons which are stored in the detector or sensor until the stored information is read out. Thus, a CCD sensor is able to produce data which a host computer can process and/or display as an image.

A telescope used for long exposure astronomical imaging of dim object, such as a galaxy, needs to have its position adjusted to compensate for the rotation of the earth relative to the object. Since most clock drive systems have some error, slight corrections to the drive rotation rate must be applied from time to time.

FIG. 1, labeled Prior Art, illustrates a typical CCD imaging camera system adapted for use with a astronomical telescope. The telescope, shown generally as 20, includes a main telescope, shown generally as 22 having a front lens system 24 and an eye piece 28. The telescope 20 is pivotally mounted around a support 34 to provide a means for rotatively adjusting the position of the telescope 20. A typical telescope includes an auxiliary or guiding telescope, shown generally as 30, which is rigidly mounted through a mount 34 to the main telescope 22. The auxiliary or guiding telescope 30 has an eye piece 38. The telescope 20 is mounted on a drive system 36 which has the ability to provide adjustments to this telescope in both right ascension and declination celestial coordinates.

CCD imaging cameras, which are well known in the art, provide the capability to either image an object in the field of view or to provide tracking of a star or other celestial body to develop correction signals for the telescope drive. The correcting signals are used to make corrections to the position of the telescope to maintain alignment of the telescope with an object in the field of view.

For example, the eye piece of the telescope 28 can be replaced by a film imaging camera attached thereto to record, on film, an object in a field of view. In such a case, a CCD tracking device could be utilized to provide correction signals to maintain telescope tracking.

Alternatively, a CCD imaging camera can be utilized as a means of recording or imaging an object in the field of view. This is illustrated in FIG. 1 which depicts the main telescope 22 having a CCD imaging camera 40 operatively replacing eye piece 28 to image an object in the field of view. Also, FIG. 1 illustrates that a CCD tracking device 44 can be operatively placed at the focus position 38 of the guiding telescope 30 to observe a star which can be utilized for developing position signals which are applied to the drive system 36 to make corrections to the telescope 20 to maintain alignment between the main telescope 22 and an object in the field of view.

In such a system, the CCD imaging camera 40 applies video signals, as depicted by arrow 46, to a driver/converter 50 to read out the imaging device. Similarly, a CCD tracking device 44 applies tracking signals, shown by arrow 48, to the driver/converter 50 to read out the tracking device. The driver/converter 50 then converts the video signals into digital signals which are transmitted, as depicted by arrow 52, to a host computer 54. The host computer 54 receives and processes the video signals from the CCD imaging camera 40 to develop an electronic image of an object in the field of view. Concurrently, the host computer 54 responses to the video signals generated by the CCD tracking device 44 to generate position correction signals which are applied, as shown by arrow 60, to a drive mechanism 36 which corrects the position of the telescope 20 to maintain alignment between the main telescope 22 including the CCD imaging camera 40 with an object in the field of view.

Alternatively, the video signals from the CCD tracking device 44 may be applied to a controller 46, shown by dashed lines and dashed box, such as for example an ST-4 controller sold by Santa Barbara Instrument Group, Santa Barbara, Calif. The output from the controller 46 is applied as shown by dashed line 42 to the drive base 36. The ST-4 controller includes separate CCD drivers, amplifiers and A/D converters. The ST-4 has a signal-to-noise ratio enabling the CCD camera to record faint objects.

The circuitry of the ST-4 controller is able to reduce dark current and increased charge accumulator per pixel before reaching saturation. These features increase the dynamic range of the CCD camera system used with the ST-4 controller.

The use of a CCD star tracker operatively coupled to the prime focus of either a guide telescope or the primary telescope is well known in the art. As mentioned before, one such known CCD star tracker is a Model ST-4 camera system offered for sale by Santa Barbara Instrument Group, Santa Barbara, Calif. When used as a star tracker, the Model ST-4 camera system generates control signals for guiding a telescope in right ascension and declination. In operation, a guide star is focused on the CCD detector, which consists of an array of elements, called pixels. The pixels are arranged in horizontal and vertical rows and, when illuminated with photons, packets of light energy from a star or object in a field of view, the photons are converted into electrons which are then converted into analog video signals for further processing.

In order to effectively use a CCD camera systems for astronomy, it is necessary for a telescope to have a drive mechanism and to utilize a tracking or autoguiding device to generate correcting signals which are applied to a host computer. The host computer generates correction signals to continually adjust the position of the telescope in response to relative movement between a tracking star and the telescope. Continual position adjustments are required in order to keep the object in a field of view in optical alignment with the telescope and the imaging device.

When the CCD star tracker is used to track a star, which is sometimes referred to as autoguiding, light energy from the star being tracked is present at a specific pixel within the CCD detector. A microcontroller detects a corresponding increase in the signal from that pixel. If relative movement between the telescope and a star occurs, light energy from the star being tracked will appear at a different pixel in the next exposure of the CCD sensor. The microcontroller then calculates how far the star has drifted and generates a control signal to correct the position of the telescope. The control signal iteration is a function of the star's positional error. The microcontroller can process an exposure, analyze the pixel of values and calculate the necessary telescope corrections in less than a second.

The Model ST-4 camera system can likewise be used as a CCD imaging camera with a telescope. When used as a CCD imaging camera, the Model ST-4 camera system is mounted at the focal position 28 of the telescope body 22 as depicted by imaging device 40. The Model ST-4 camera system is used in conjunction with a PC such as for example, an IBM XT/AT/PS/2 compatible PC or an Apple Macintosh. The Model ST-4 camera system will record and display images of objects that generally cannot be seen with the naked eye. The imaging CCD sensor within the Model ST-4 camera system converts incident photons into electrons, which are integrated within a pixel to form an image of an object in the field of view of the CCD sensor.

The Model ST-4 camera system is connected to a host computer having appropriate software to process the data.

The ST-4 was described well in an article entitled, "A Versatile CCD for Amateurs" by Dennis di Cicco which appeared at pages 250 through 255 in the September, 1990 Sky & Telescope (the "di Cicco Reference I"). It describes the ST-4 CCD camera system. SBIG provides an upgrade to the ST-4X, which has lower noise, but is not a stand-alone tracker. This was described in an article entitled "CCD Test Report: SBIG's new ST-4X CCD Camera System" by Dennis di Cicco in the Spring, 1994 CCD Astronomy (the "di Cicco Reference II"). This article described the tracking and imaging capabilities of the ST-4 camera. Specifically the di Cicco Reference II describes, in detail, the technical differences between the ST-4 CCD camera system and the ST-4X CCD camera system, the details of the operational software for the ST-4X CCD camera system and the details of the control program, generally known as CCDOPS, and the operating features thereof.

An ST-6 CCD imaging camera is offered for sale by the Santa Barbara Instrument Group, Santa Barbara, Calif. The ST-6 CCD imaging camera includes a track and accumulate mode which is intended to be a substitute for auto guiding, or star tracking. The ST-6 CCD camera system takes a series of user-specific "snapshots" (up to 64) which is disclosed by U.S. Ser. No. 07/964,775 filed Oct. 22, 1992 and entitled ELECTRONIC CAMERA WITH AUTOMATIC IMAGE TRACKING AND MULTI-FRAME REGISTRATION AND ACCUMULATION. The host computer automatically aligns each frame or "snapshot" on a specific reference star and then automatically adds the light energy from the object observed from the field of view to produce an image from the accumulated light energy.

The track and accumulate mode provides the advantage of compensating for errors which are introduced into the CCD sensor because of periodic errors in the telescope drive, the drift due to poor alignment or atmospheric refraction. The intended result is to provide a single image exposed for the same total duration as that of a mechanically adjusted telescope positioning system.

A description of the ST-6 CCD imaging camera is disclosed in the article entitled "ST-6 CCD Imaging Camera by Dennis di Cicco which appears at pages 395 through 400 in the October, 1992 issue of Sky and Telescope (the "di Cicco Reference III"). The di Cicco Reference III discloses, in detail, the technical aspects of the track and accumulate mode of the ST-6 CCD imaging camera. The di Cicco Reference III discloses that although no CCD camera can simultaneously take an exposure and guide a telescope, the track and accumulate feature has certain advantages for certain specific applications.

Originally, the typical CCD arrays available to professional astronomers were 512-by-512 pixel chips measuring about one half inch on a side; such an array when used with a telescope, provides a few arc minutes of field of view at the focus of most research telescopes. CCD arrays now known in the art are 2048 by 2048 pixel square arrays and can provide a large field of view of the sky for imaging.

It is also known in the art to provide a "Mini Mosaic" CCD camera which is built from an assembly of four (4) 2,048 pixel Square CCD arrays or other size arrays.

Prior Patents

A solid state sensing device having two photosensitive sections based on an interline transfer type CCD ("IT-CCD") is disclosed in U.S. Pat. No. 4,651,001. U.S. Pat. No. 4,651,001 discloses that the imaging sensing device has a photosensitivity corresponding to two different light wavelength ranges. The first radiation photosensing section used for sensing infrared radiation is formed on a substrate. The substrate is covered by insulative layers and a transparent electrode is formed on the insulative layer to serve as a pixel electrode. A photoconductive layer or amorphous silicon layer serves as a second photosensing section on the structure. The amorphous silicon layer is photosensitive to a predetermined visible light wavelength range so as to be sensitive to visible radiation. Thus, the first photosensing section senses only infrared radiation and the second photosensing section senses only visible radiation. The two photosensing sections are stacked on a substrate in a two-layer structure.

U.S. Pat. No. 4,651,001, although disclosing two separate distinct photosensing sections performing two functions, do not disclose, teach or suggest that the two photosensing sections or sensors can be positioned in a spaced adjacent arrangement. In the structure provided in U.S. Pat. No. 4,651,011, a Schottky diode is used at the infrared radiation sensor. The amorphous silicon layer is used as the visible light sensor. It is necessary to maintain a large temperature gradient between the Schottky diode and the amorphous silicon layer and each layer must be cooled to two different temperature levels.

U.S. Pat. No. 4,651,001 does not disclose, teach or suggest the use of two separate sensors for tracking and imaging for use in astronomical imaging and processing of an object in a field of view.

It is also known in the art to utilize multiple CCD arrays in a system adapted for tracking either a star or a missile. Typical of such CCD arrays are those disclosed in U.S. Pat. Nos. 5,300,781; 5,066,860 and 5,012,081.

Each of U.S. Pat. Nos. 5,300,781; 5,066,860 and 5,012, 081 utilize the CCD arrays as star trackers or optical sensors for detecting a guide star and utilize the same for controlling directions of a missile, satellite or space vehicle relative to the star.

It is also known in the art to utilize a single CCD imaging systems which are mounted on telescopes, used to track stars or air borne objects such a helicopters. Typical of such systems are those disclosed in U.S. Pat. Nos. 5,341,435; 5,260,557; 5,177,686; 5,162,861; 4,944,587 and 4,388,646.

U.S. Pat. No. 4,939,369 discloses an imaging and tracking sensor designed for providing a multi function imaging and tracking capability. U.S. Pat. No. 4,939,369 discloses that the multi function imaging and tracking device is in the form of a Schottky diode array lying in a first plane to perform a tracking and acquisition function. A second Schottky diode array lying in a second plane performs an imaging function. The first array is a low resolution. high speed array and the second array is a high resolution, low speed array. U.S. Pat. No. 4,939,369 discloses that the arrays are formed in a stack relationship wherein the first array responds to short wave length radiation of interest which is focused on a tracking array or a long wave length radiation of interest is focused on the imaging array 24. Further, the imaging tracking sensor is responsive to a reflected beam such, as for example, a laser beam. The laser beam is projected upon a target and a portion of the laser beam is reflected from the target to the tracking and imaging structure for detection and processing.

The U.S. Pat. No. 4,939,369 discloses that the structure can also be utilized to provide for monitoring of visible and infrared radiation rather than for a tracking and imaging application.

U.S. Pat. No. 4,939,369 deals with a different problem, mainly tracking and imaging on the same object. It does not reveal the technique of guiding on an off axis object with the second array, such as is possible in astronomical imaging. In fact, the concept of tracking on the object being imaged works poorly in astronomy since such a technique requires the light to be divided between two sensors, with the associated loss of signal, and the object being imaged is often extremely dim.

SUMMARY OF THE INVENTION

None of the prior art disclose, teach or suggest an optical head for attachment to an optical system, such as a telescope, for providing a tracking and imaging apparatus wherein the optical head includes a first sensor for imaging an object in a field of view and a second sensor for tracking a star which is positioned a predetermined distance from and in a spaced relationship adjacent to the first sensor.

This invention relates to a new and novel optical head having an imaging sensor and a tracking sensor which is accurate, sensitive and adapted for use with a host PC computer. The optical head of the present invention is ideally suited to be used with telescopes for astronomical long exposure imaging. The optical head is used as a tracking and imaging apparatus and provides a simple and economical means for obtaining high quality, long term imaging of celestial bodies using a PC computer. It provides the user with a lower cost, simpler solution to guiding and imaging objects with a CCD camera.

The present invention relates to an optical head and optical system for attachment to a platform, such as, for example, a space vehicle, missile or telescope. The optical head comprises a first sensor for imaging an object in a field of view and a second sensor for tracking a star off axis to an object in a field of view. The second sensor is rigidly supported and positioned a selected distance from and adjacent to said first sensor and is designed to generate signals for a drive system representative of changes in relative position of the platform to a star being tracked. The drive system functions to maintain optical alignment of the first sensor with an object in the field of view as corrections are made by a drive system to platform positions. A cooling means is provided for cooling the first sensor and the second sensor at a predetermined temperature so as to minimize the generation of a dark current in the first sensor and the second sensor.

In the preferred embodiment of the present invention, the optical head is used with a telescope having a drive system for making corrections to positions of the telescope to maintain tracking alignment with an object in a field of view. The optical head comprises a CCD camera adapted to be operatively connected to a telescope and moveable therewith. The CCD camera has an internal pedestal for rigidly supporting an imaging CCD and a tracking CCD positioned a predetermined distance from and adjacent to said imaging CCD. The tracking CCD being is adapted to track a star at an off axis location to an object in a field of view to be imaged by the imaging CCD. The tracking CCD is used to generate signals for a drive system representative of changes in relative positions of a telescope and a star being tracked. The drive system is used to maintain optical alignment of the imaging CCD with an object in the field of view as corrections are made by a drive system to positions of a telescope.

In addition, a method of tracking and imaging for a telescope having a focal length and a drive system for making correction to positions of the telescope to maintain relative position or alignment between the telescope and an object in a field of view of a telescope is shown. The method comprises the steps of: mounting on a telescope at the focal length thereof a CCD camera having an imaging CCD rigidly mounted at a first location and a tracking CCD rigidly mounted relative to the imaging CCD at a second location which is positioned a predetermined distance from and adjacent with the imaging CCD; and positioning the telescope at an object in the field of view to direct light therefrom through the telescope onto the imaging CCD and to direct light energy from a star at an off axis location in the field of view onto the tracking CCD sensor.

The known prior art devices have certain disadvantages in that none of the CCD camera or optical heads are in the form of a simple, integrated housing enclosing a first sensor as an imaging sensor and a second rigidly mounted in a spaced relationship adjacent relationship. For example, the CCD sensors can be mounted in a substantially co-planar or angularly disposed positional relationship, that functions as a tracking and imaging apparatus for long term exposures of an object, such as a galaxy, in a field of view.

Also, as described above, the known prior art imaging and tracking devices have the tracking CCD located on the guiding telescope and the CCD imaging device on the main telescope. During long exposures, differential deflections typically occur between the guiding telescope and the main telescope which introduce errors into the imaging process. The errors are due to several factors, such as for example, deflections due to changing relationship of the telescope structure with respect to gravity as the earth rotates, thermal contractions as the night cools and the like.

Another problem associated with the prior art tracking and imaging combinations is the selection of a tracking star for the tracking device that is too far off axis could result in the field of view being imaged by the imaging device rotating while the tracking star is followed. This results from improper polar alignment.

The optical head of the present invention overcomes certain of the problems associated with the prior art solid state sensing device disclosed in U.S. Pat. No. 4,651,001, the multiple CCD arrays disclosed in U.S. Pat. Nos. 5,300,781; 5,066,860 and 5,012,081, and the single CCD imaging system disclosed in U.S. Pat. Nos. 5,341,435; 5,260,557; 5,177,686; 5,162,861; 4,944,587 and 4,388,646 and the imaging and tracking sensor disclosed in U.S. Pat. No. 4,939,369. None of the above cited U.S. Patents including U.S. Pat. No. 4,939,369 disclose, teach or suggest an optical head having the sensor rigidly positioned relative to each other in either a coplanar or angularly disposed relationship to receive separate and distinct light energy from an object enabling each sensor to independently perform a function. In the imaging and tracking sensor disclosed in U.S. Pat. No. 4,939,369 the apparatus utilizes a means for detecting light comprising a low angular resolution array reflected from a target and a separately operable, spaced substantially parallel means comprising a higher angular resolution array for imaging a target detected by the detecting means.

These and other problems of the prior art devices are overcome by the teachings of the present invention.

The optical head of the present invention utilizes two separate sensors in a rigid, coplanar or angularly disposed position having substantially the same angular resolution array which concurrently respond to light image to perform imaging and tracking functions.

Thus, one advantage of the present invention is that the optical head of the present invention overcomes the problems associated with differential deflection between a guide telescope and main telescope by using off axis guiding in the form of a light from a star located in the periphery of the field of view and outside of the area being imaged by the imaging CCD.

Another advantage of the present invention is that the optical head utilizes a single cooling and readout means.

Another advantage of the present invention is that the structure of the CCD camera and placement of the tracking CCD sensor relative to the imaging sensor has a high probability of picking an appropriate tracking star from the field of view of the telescope. The user can select the optimum guide or tracking star in the field of tracking for the computer to use for tracking purposes or, through software control, have the computer select the guide or tracking star for use during imaging.

Another advantage of the present invention is that the above described problems of the prior art are overcome by combining a star tracking sensor and an imaging sensor into an integrated housing with the tracking CCD sensor off axis to the imaging CCD sensor.

Another advantage of the present invention is that the tracking sensor and imaging sensor, in the preferred embodiment, are CCD devices. The CCD sensors can be rigidly mounted in a side-by-side adjacent coplanar relationship, or a reflective device, such as for example a mirror, can be positioned at an angle to the imaging CCD device to reflect light from a tracking star on to a tracking CCD sensor rigidly mounted at an angle to the imaging CCD sensor.

Another advantage of the present invention is that the close proximity of the imaging CCD sensor to the tracking CCD sensor permits the use of a more expensive cooling means to reduce dark current noise to detect light energy from stars that have faint light.

Another advantage of the present invention is that guiding errors due to improper polar alignment is reduced due to the close proximity of the tracking CCD and imaging CCD.

Another advantage of the present invention is that the tracking CCD sensor can share with the imaging CCD sensor common cooling means, clock signals and A/D converter, and the main telescope optics, resulting in lower cost to the user.

Another advantage of the present invention is that when a mirror is used to reflect light energy from a tracking star to the tracking CCD sensor, the mirror can be set at a position that does not vignett light traveling to the imaging CCD sensor thereby eliminating photometric errors.

Another advantage of the present invention is that the optical head can be used to develop position control signals for a computer to control a high frequency response positioning apparatus for use with a telescope to maintain tracking alignment to compensate for wind deflections imparted to the telescope, or low frequency atmospheric turbulence, which tends to cause an image to wander randomly at high magnification.

BRIEF DESCRIPTION OF THE DRAWINGS

These and other advantages of this invention will be readily apparent when considered in light of the detailed description hereinafter of the preferred embodiment and when considered in light of the drawing set forth herein which includes the following figures:

FIG. 1 is a perspective top, front and left end view of a prior art telescope having separate tracking and imaging devices operatively attached to the guiding telescope and main telescope, respectively;

FIG. 2 is an electrical block diagram of an optical head showing a partial schematic of the video signal processing system and host computer;

FIG. 3 is a left side elevational of one embodiment of an optical head having an image sensor rigidly mounted on a pedestal and in a substantially coplanar relationship with a tracking sensor;

FIG. 4 is a front elevational view of the optical head of FIG. 3;

FIG. 5 is a left side elevational of another embodiment of an optical head having an image sensor rigidly mounted on a pedestal and at an angle to the tracking sensor with a reflector located intermediate the sensors to reflect light energy from a tracking star located on the periphery of and off axis to the field of view received by the imaging sensor;

FIG. 6 is a front elevational view of the optical head of FIG. 5;

FIG. 7 is a partial, pictorial front elevational view of a housing of an optical head having a central area for rigidly mounting the tracking CCD sensor at an angle to the imaging CCD sensor and wherein a mirror is rigidly mounted therebetween to reflect light energy from a tracking or guiding star to the tracking CCD sensor;

FIG. 8 is a front right side elevational view of the housing and optical head of FIG. 7;

FIG. 11 is a pictorial representation of a CCD camera of the present invention and a telescope using a plane parallel plate to to provide high frequency response corrections to the CCD camera;

FIGS. 12 (a) and 12 (b) depict diagrammatically the plane parallel plate positioning for correcting the light path of a field of view for shifts due to guiding error, turbulence and wind deflection affecting a telescope;

FIG. 13 is a pictorial representation of a high frequency response positioning apparatus for adjusting the position of a plane parallel plate using an adjustable inner gimbal and adjustable outer gimbal structure; and FIG. 14 is a diagrammatic representation of an optical head having a first sensor, a second sensor and a beam splitter for controlling the light energy reflected to the second sensor.

DESCRIPTION OF THE PREFERRED EMBODIMENT

Figure 9:
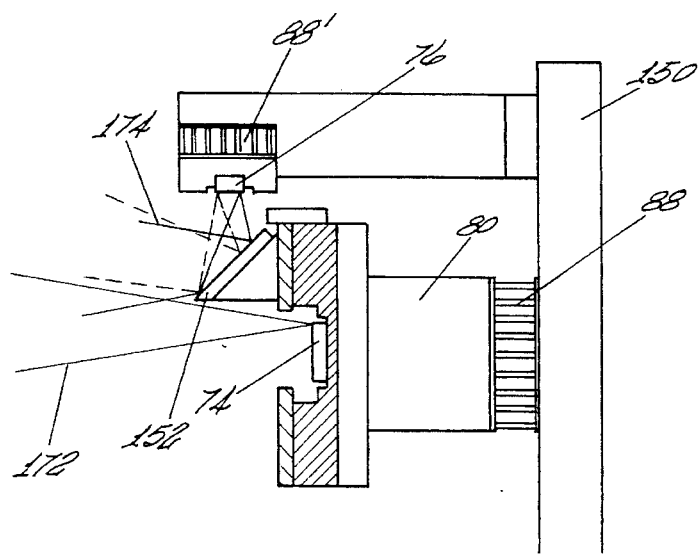
FIG. 9 is a partial, pictorial side elevational view of the preferred embodiment having a housing defining the optical head which includes a central area for rigidly mounting the tracking CCD sensor at an angle to the imaging CCD sensor located in a support and wherein a mirror is rigidly mounted therebetween to reflect light energy from a tracking or guiding star outside of the light from the field of view received by the imaging CCD sensor to the tracking CCD sensor.

FIG. 1 is a representation of a prior art telescope as described above. The optical head of the present invention is mounted on the eyepiece 28 of the main telescope and replaces the CCD imaging camera 40. In using the present invention, the tracking CCD device 44 is eliminated.

In FIG. 2, the optical head is shown by dashed box 70 and is adapted to be affixed to a platform. The platform may be a missile, spacecraft or other similar apparatus. In the preferred embodiment the platform is a telescope used for astronomical imaging of celestial bodies. The optical head 70 is adapted to be attached to the base in a position to have the object to be tracked, observed or imaged in the field of view of the platform.

The optical head 70 is located in the central area of a housing which includes an aperture having a transparent member 166 which is shown in greater detail in FIG. 7. A shutter 72 is provided for remote dark frame collection. The optical head 70 includes a first sensor 74 for imaging an object in a field of view and a second sensor 76 for tracking a star off axis to an object in a field of view. The second sensor 76 is rigidly supported and positioned a selected distance from and adjacent to the first sensor 74. In the preferred embodiment, a pedestal 80 is used as a support plate to rigidly support the first sensor 74 and the second sensor 76 thereby avoiding any errors that could be introduced into the tracking and imaging process due to differential deflection.

The second sensor 76 is adapted to generate signals for a drive system, represented generally by arrow 84. The signals are representative of changes in relative position of the base, such as telescope 20, to a star being tracked to maintain optical alignment of the first sensor 74 with an object in the field of view. The corrections are made to positions of the telescope 20 by the drive system 84.

In FIG. 2, a cooling means 88 is provided for cooling the pedestal 80, the first sensor 74 and the second sensor 76 at a predetermined temperature so as to minimize the generation of a dark current in the first sensor 74 and the second sensor 76.

The first sensor 74 and the second sensor 76 may be a charged coupled device, generally referred to as a CCD, a charge transfer device, generally referred to as a CTD, or a photosensing device or layer as is well known in the art. In the preferred embodiment of the present invention, the first sensor 74 is an imaging CCD and the second sensor is a tracking CCD.

One example of a imaging CCD that can be used for practicing this invention is a Kodak-0400 CCD with 768-by-512 pixels (9 microns square). One example of a tracking CCD that can be used for practicing this invention is a Texas Instrument TC-211 CCD with 192-by-165 pixels (13.75×16 microns).

The above are exemplary only and are not intended to limit the type of CDD sensors that can be used for practicing this invention.

Cooling is an important feature of the present invention for several important reasons. Dark current in a CCD is due to thermally generated electrons which are generated within the CCD. In a CCD, the dark current can cause each pixel to fill with electrons in a few seconds at room or ambient temperature, even in the absence of light. By cooling the CCD, this source of noise is reduced, the sensitivity of the CCD is increased and longer exposures of an object in a field of view are possible.

Typically, for every 8° C. of additional cooling, the dark current is reduced about 50%.

In the preferred embodiment, the desired cooling temperature is in the range of about 0° C. to about −50° C.

In the preferred embodiment, the cooling means 88 is a single stage thermoelectric (TE) cooler. A typical TE cooler is a solid state cooler sold by Marlow or Melchor.

If a larger imaging CCD is used, such as a Texas Instrument TC-215 CCD which is a 1024-by-1024 pixels (12 micron square), a two stage cooler may be required.

Alternatively, the cooling means could be in the form of liquid or dry nitrogen or other suitable cooling medium.

It is also envisioned that the cooling could be either unregulated and rely on ambient temperature to reach a steady state cooling temperature, or temperature sensing thermistors could be mounted on the CCD to monitor the temperature and the host computer can be used to control the cooling temperature at predetermined temperature levels.

In FIG. 2, the output of the first sensor 74 depicted by arrow 90 and the output of the second sensor 76 depicted by arrow 94 are applied to an analog multiplexer 98. The output of the analog multiplexer 98 depicted by arrow 100 is applied to a A/D converter 102. One typical A/D converter is a 16 bit A/D converter.

The output of the A/D converter 102 depicted by arrow 108 is applied to a line driver 110. The CCDs 74 and 76, multiplexer 98, A/D converter 102, and line driver 110 are operatively connected to a power supply 114 depicted by line 116.

The line driver 110 is operatively connected to a host P.C. 120 having a key board 122 for applying input signals thereto by output 128 via a parallel port 126, and for user control by conductors 130. Thus the host P.C. is able to interface with and control the line driver 110 to receive and transmit electrical signals to control the optical head 70.

For example, the line driver 110 applies clock signals via leads 132 and 134 to the first sensor 74 and the second sensor 76 to control the operation of the CCD sensor. In addition, input video signals communicated by the line driver 110 to the host P.C. 120 are processed by the host. In the event the video input signals are from the first sensor 74, the host P.C. 120 processes the signals to produce an electronic image which can be stored or displayed as a visual image on the host P.C. 120.

In the event that the video input signals are from the second sensor 76, the host P.C. 120 processes the signals to produce control signals representative of position control signals which are applied via the line driver 110 to relays 140. The relays then apply the position control signals to the input of a drive system 84. The drive system 84 responds to the position control signals to adjust the position of the telescope or base to maintain base or telescope alignment with an object in a field of view.

In FIGS. 3 and 4, the CCD sensors are positioned inside a housing and are supported on a support plate 150. The support plate 150 supports the TE 88, the pedestal 80 and the first sensor 74 and second sensor 76.

As depicted in FIGS. 3 and 4, the optical head has the tracking CCD, represented by second sensor 76, positioned adjacent to and substantially coplanar to the imaging CCD represented by the first sensor 74. The pedestal 80 functions to rigidly hold the imaging CCD and the tracking CCD in spaced relationship thereby eliminating differential deflections therebetween.

In FIGS. 5 and 6, the tracking CCD, represented by the second sensor 76 is rigidly mounted via the pedestal 80 at an angle to the imaging CCD, represented by first sensor 74. The optical head depicted by FIGS. 5 and 6 head further comprises a reflecting member 154 positioned intermediate the tracking CCD and the imaging CCD to reflect to the tracking CCD light energy from a star slightly outside of or off axis to the field of view of the imaging CCD.

In the preferred embodiment, the tracking CCD is rigidly mounted at a selected angle to the imaging CCD and the imaging CCD has an outer section. The reflecting member 154 is a mirror operatively rigidly mounted at a selected angle, typically 45°, to the imaging CCD to intercept and reflect to the tracking CCD light energy from a star located slightly outside the imaging CCD's field of view.

In FIGS. 3 through 6 the CCD optical head uses a single stage thermoelectric cooler 88 which is operatively connected to the pedestal 80 for cooling the tracking CCD and imaging CCD.

FIGS. 7 and 8 illustrate an imaging and tracking apparatus having a housing 160 defining an opening 162 therein. The opening 162 has a transparent member, such as for example a window 166, through which the light energy from the field of view containing the object and the tracking star passes into the interior of the housing 160. A support plate 150 is located within and is rigidly attached to the housing 160.

A thermoelectric cooler 88 is operatively rigidly mounted on and insulated from the base plate 150. A pedestal 80 is rigidly mounted onto and adapted to be cooled by the thermoelectric cooler 88. AS illustrated in FIG. 8, the cooler 88 is a first stage cooler that cools only the imaging CCD. A second stage cooler depicted by 88' cools the tracking CCD.

The housing and its components comprise a CCD camera having an imaging CCD, represented by first sensor 74, and a tracking CCD, represented by the second sensor 76, positioned a predetermined distance from and adjacent to the imaging CCD. The imaging CCD and the tracking CCD are rigidly mounted onto the pedestal 80 and positioned in optical alignment with the opening 162 in the housing 160.

In the embodiment of FIGS. 7 and 8, the optical head preferably has the reflecting member 154 positioned intermediate the tracking CCD and the imaging CCD to reflect to the tracking CCD light energy from a star in the field of view of the imaging CCD.

In FIG. 8, this pictorial diagram differs slightly from that of FIG. 7 because it also shows the mechanical shutter 72 which is actuated by actuation motor 170.

FIG. 9 is an enlarged view of the pictorial representation of FIG. 8 and illustrates that the light from the periphery of the field of view incident on the imaging CCD is reflected by the mirror 154 to the tracking CCD. The light energy shown by lines 172 is directed to and impinges upon the imaging CCD while the light energy depicted by lines 174 are reflected to the tracking CCD. The structure of the optical head is based on a tracking star or body being available as a tracking or guiding star in the field of view. This design criteria has been validated as shown by the chart of FIG. 10.

Figure 10:
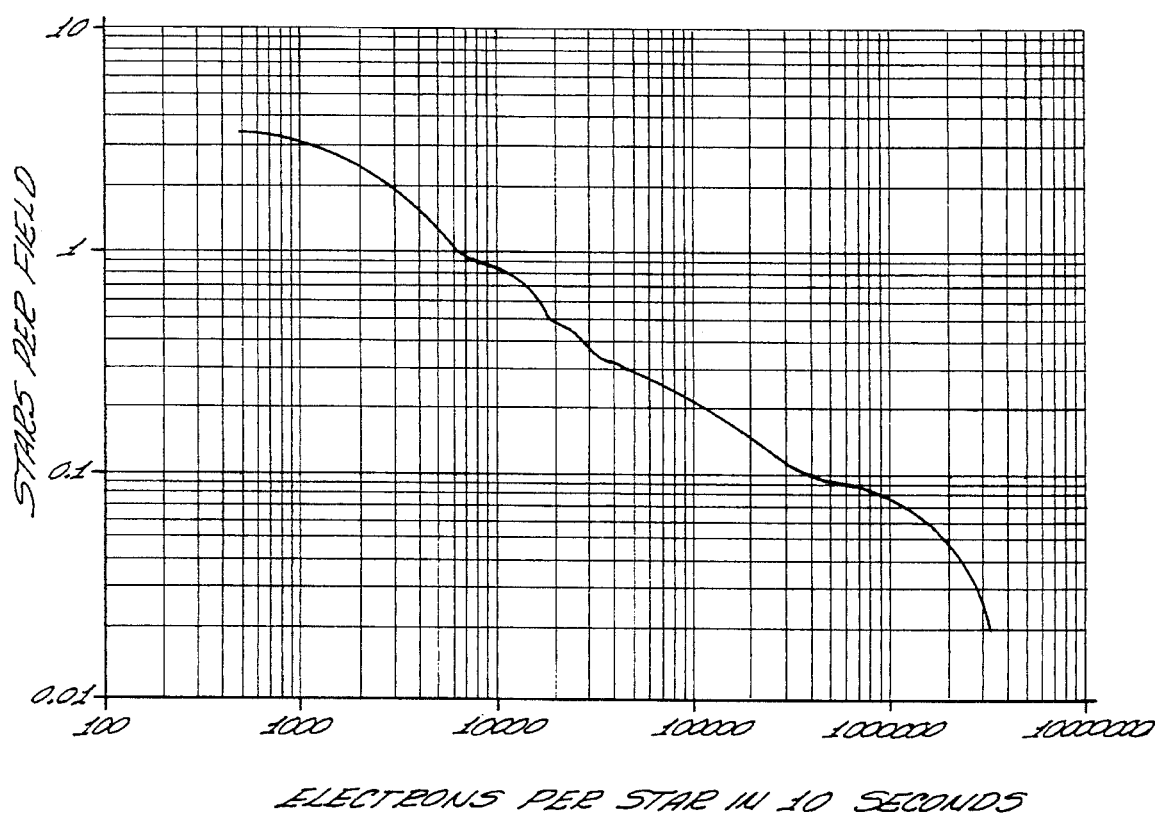
FIG. 10 is a probability chart showing the stars per field plotted as a function of the electrons per star in 10 seconds to show the number of stars available as a guide or tracking star when using a 10-inch aperture F/6.3 telescope.

FIG. 10 is a chart based on actual data collected to determine the probability that an acceptable or suitable guide or tracking star would be present in the field of view for use by the optical head of the present invention. The data was collected using an F/6.3 telescope of 10-inch aperture.

FIG. 10 is a plot of the stars per field versus the electrons per star generated in ten (10) seconds. In order to have a star suitable for guiding, about 500–1000 electrons are required to be created in the tracking CCD within an exposure. As can be seen in the chart of FIG. 10, this implies about 3 stars per field of view will be detected. The odds of no star being found, using Poisson statistics, is less than 5%. Therefore, a 95% probability exists that a suitable guide star would be available which satisfies the criteria for a suitable tracking star.

In the diagrammatic representation of FIG. 11, a high frequency response positioning apparatus having a plane parallel mirror 182 is shown in use by being positioned between a telescope 180 and a CCD camera 184 wherein the CCD camera is an optical head using the teachings of this invention.

A high frequency response positioning apparatus, sometimes referred to as a motion compensator, removes high frequency (as compared to the frequency of the drive system which adjusts the position of the telescope) motions of the tracking star or object in the field of view caused by wind, slow atmospheric turbulence and rapid guiding errors. This has a highly beneficial result because by removing such motions of the light from a celestial body, the image that can be produced are about two to three times smaller than images produced without the motion compensator.

FIGS. 12(a) and 12(b) pictorially illustrate this phenomena. In FIG. 12(a), the plane parallel plate 182, which is an optical element, passes a light ray, depicted by segments 190, 196 and 200, essentially undeviated through the element and onto the CCD array. If the plane parallel plate is tilted, as illustrated in FIG. 12(b), the ray segment in the material 196 will be deflected by an angle alpha, but then re-emerges at the original incidence angle with a horizontal shift. The horizontal deviation is proportional to the tilt of the plate. This technique works well in a converging beam since the light rays can be deviated horizontally with a negligible focus shift.

The plane parallel plate motion compensator works on the following principle. If a movement of the telescope occurs resulting in movement of the object the movement can be detected by the CCD camera and the plane parallel plate can be rapidly tilted by a drive mechanism to compensate for such movement to maintain precise alignment.

FIG. 13 illustrates the high frequency response position apparatus for motion compensation which is adapted for use with a telescope to maintain tracking alignment with an object in a field of view. The positioning apparatus includes a plane parallel plate 206 and an inner gimbal 210 operatively connected to a first rotatable shaft 212. The first rotatable shaft 212 is fixedly attached to the plane parallel plate 206 to permit controlled rotation adjustment thereof about a first axis which is coincident with the axis of the first rotatable shaft 212.

A first rotary actuator 216 is operatively connected to the first rotatable shaft 212 for controllably rotating the plane parallel optical element 206 around the first axis in response to a first control signal shown by arrow 220.

An outer gimbal 224 is operatively connected to a second rotatable shaft 228 wherein the second rotatable shaft 228 is fixed by attached to the inner gimbal 210 to permit controlled rotational adjustment thereof about a second axis which is coincident with the axis of the second rotatable shaft 228.

A second rotary actuator 232 is operatively connected to the second shaft 228 for controllably rotating the inner gimbal 210 and the plane parallel plate 206 around the second axis in response to a second control signal depicted by arrow 240. the control signals are generated by the host P.C.

Referring again to FIG. 11, the high frequency response positioning apparatus further includes a tracking and imaging apparatus, such as CCD camera 184, which is adapted to be operatively coupled to a telescope 180 with the plane parallel plate 206 positioned there between for tracking relative movement of an object in the field of view of a telescope while concurrently imaging an object in the field of view. The tracking and imaging apparatus generates the first and second control signals 220 and 240 as position correction signals which are applied to the first rotary actuator 216 and the second rotary actuator 232, respectively, to make corrections to the relative position of the plane parallel plate 206 to maintain optical alignment of the telescope with an object in the field of view.

FIG. 14 illustrates the use of a beam splitter 260 which is positioned in front of the first sensor 262, the imaging CCD, to pass light energy received from an object in a field of view of the first sensor 262 as shown by arrow 268 and to reflect light to the second sensor 264, the tracking CCD as shown by arrow 270. The beam splitter 260 could be fabricated to split 50/50 the light energy 262, or some other ratio such as 60/40, between the first sensor 262 and the second sensor 264. The beam splitter 260 could be fabricated to split the light energy by wavelength, whereby red, green and blue light energy wavelength is directed or transmitted to the first sensor 262 as an imaging CCD and near infrared light energy wavelength is directed or transmitted to the second sensor 264 as a tracking CCD. The beam splitter could be formed by a thin film coating on a glass plate or by using a pellicle (a thin membrane).

A method of tracking and imaging for a telescope having a focal length and a drive system for making correction to positions of the telescope to maintain relative position or alignment between the telescope and an object in a field of view of a telescope is disclosed herein. The method comprises the steps of mounting on a telescope at the focal length thereof a CCD camera having an imaging CCD at a first location and a tracking CCD rigidly mounted at a second location which is positioned a predetermined distance from and adjacent with said imaging CCD; and positioning the telescope at an object in the field of view to direct light therefrom through the telescope onto the imaging CCD and to direct light energy from a star at an off axis location in the field of view onto the tracking CCD sensor.

The above method may further comprising the step of generating with a computer position signals from input video signals developed by the tracking CCD in response to light energy from a star and applying said position signals to the drive system to make corrections to the relative position of the telescope to the star to maintain optical alignment of the imaging CCD with an object in the field of view of the telescope.

The method may have the CCD camera include a thermoelectric cooler which is operatively connected to and adapted to cool the pedestal, tracking CCD and imaging CCD and further comprise the step of cooling the tracking CCD and imaging CCD to improve the signal-to-noise ratio of the video signals developed therefrom.

The method may further comprise the step of generating with a computer an electronic image of an object in the field of view from the input video signals developed by the imaging CCD in response to light energy of an object in the field of view.

The method may further comprise the step of processing the electronic image with an image processing program.

The method may further comprise the step of generating a visual image of the processed electronic image.

The method may further comprise the step of storing in a memory the electronic image of an object in the field of view.

The method may further comprise the step of processing the stored electronic image with an image processing program.

The method may further comprise the step of storing in a memory the processed electronic image.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

What is claimed is:

1. An optical head for attachment to a platform comprising
a housing;

a first sensor for imaging an object in a field of view and a second sensor for tracking a star off axis to the field of view of said first sensor each of which are located in said housing, said second sensor being rigidly supported and positioned a selected distance from and adjacent to said first sensor and being adapted to generate signals for a drive system representative of changes in relative position of the platform to a star being tracked to maintain optical alignment of the first sensor with the object in the field of view as corrections are made by the drive system to positions of the platform.

2. The optical head of claim 1 wherein said second sensor is positioned adjacent to and substantially coplanar with the first sensor.

3. The optical head of claim 1 wherein said second sensor is rigidly mounted at an angle to said first sensor and wherein said optical head further comprises a reflecting member positioned intermediate the first sensor and the second sensor to reflect to said second sensor light energy from the star located off axis to the field of view of said first sensor.

4. The optical head of claim 3 wherein said second sensor is rigidly mounted at a selected angle to the first sensor and wherein said first sensor has an outer edge and wherein said reflecting member is a mirror operatively rigidly mounted at an angle adjacent to the outer edge of said first sensor to intercept and reflect to the second sensor light energy from the star located off axis to the field of view received by the first sensor.

5. The optical head of claim 1 further comprising a pedestal for rigidly supporting said first sensor relative to said second sensor; and cooling means for cooling said pedestal, said first sensor and said second sensor at a predetermined temperature so as to minimize the generation of a dark current in said first sensor and said second sensor.

6. The optical head of claim 5 wherein said cooling means comprises a thermoelectric cooler operatively connected to said pedestal.

7. The optical head of claim 6 further comprising a support plate operatively mounted to said thermoelectric cooler for supporting said thermoelectric cooler, said first sensor and said second sensor.

8. An optical head comprising a single housing;

a first sensor located in said housing for imaging an object in a field of view;

a second sensor for tracking a star off axis to the of view of said first sensor, said second sensor being rigidly supported and positioned a predetermined distance from and adjacent to said first sensor located in said housing and being adapted to generate signals for a drive system; and cooling means for cooling said first sensor and said second sensor at a predetermined temperature so as to minimize the generation of a dark current in said first sensor and said second sensor.

9. An optical head for use with a telescope having a drive system for making corrections to positions of the telescope to maintain tracking alignment with an object in a field of view, said optical head comprising a housing adapted to be operatively coupled to the telescope and moveable therewith;

a CCD camera located within said housing and having a pedestal for rigidly supporting an imaging CCD and a tracking CCD positioned a predetermined distance from and adjacent to said imaging CCD, said tracking CCD being adapted to track a star at an off axis location to the field of view of said imaging CCD to be imaged by the imaging CCD and to generate signals for the drive system representative of changes in relative positions of the telescope and the star being tracked to maintain optical alignment of the imaging CCD with the object in the field of view as corrections are made by the drive system to positions of the telescope.

10. A CCD optical head comprising a pedestal;

an imaging CCD for imaging an object in a field of view, said imaging CCD being rigidly attached to the pedestal at a first location; and a tracking CCD for tracking a star off axis to the field of view of said imaging CCD, said tracking CCD being rigidly attached to said pedestal at a second location which is positioned a predetermined distance from and adjacent to said imaging CCD.

11. The CCD optical head of claim 10 further comprising cooling means for cooling said pedestal, said imaging CCD and said tracking CCD at a predetermined temperature so as to minimize the generation of a dark current in said first sensor and said second sensor.

12. The CCD optical head of claim 10 wherein said tracking CCD is positioned adjacent to and substantially coplanar to the imaging CCD.

13. The CCD optical head of claim 10 wherein said tracking CCD is rigidly mounted at an angle to said imaging CCD and wherein said optical head further comprises a reflecting member positioned intermediate the tracking CCD and the imaging CCD to reflect to the tracking CCD light energy from the star off axis to the field of view of the imaging CCD.

14. The CCD optical head of claim 10 wherein the tracking CCD is rigidly mounted at a selected angle to the imaging CCD and wherein the imaging CCD has an outer section, said CCD optical head further comprising a mirror operatively rigidly mounted at a selected angle adjacent to the imaging CCD to intercept and reflect to the tracking CCD light energy from the star located off axis to the imaging CCD field of view.

15. The CCD optical head of claim 10 further comprising a thermoelectric cooler operatively connected to said pedestal for cooling the tracking CCD and imaging CCD.

16. The CCD optical head of claim 15 further comprising a support plate operatively mounted to said thermoelectric cooler for supporting its thermoelectric cooler, tracking CCD and imaging CCD.

17. An imaging and tracking apparatus comprising a housing having an opening therein;

a support plate located within and rigidly attached to said housing;

a thermoelectric cooler operatively rigidly mounted on said base plate;

a pedestal rigidly mounted onto and adapted to be cooled by said thermoelectric cooler; and a CCD camera having an imaging CCD for imaging an object in a field of view and a tracking CCD for tracking a star off axis to the field of view of said imaging CCD, said tracking CCD positioned a predetermined distance from and adjacent to said imaging CCD, said imaging CCD and said tracking CCD sensor being rigidly mounted onto said pedestal and positioned in optical alignment with the opening in said housing.

18. A method of tracking and imaging for a telescope having a focal length and a drive system for making correction to positions of the telescope to maintain relative position or alignment between the telescope and an object in a field of view of the telescope comprising the steps of mounting on the telescope an optical head including a housing and a CCD camera located within said housing and positioned to be at the focal length of said telescope, said CCD camera having an imaging CCD at a first location and a tracking CCD rigidly mounted at a second location which is positioned a predetermined distance from and adjacent with said imaging CCD; and positioning the telescope at the object in the field of view to direct light therefrom through the telescope onto the imaging CCD and to direct light energy from a star at an off axis location in the field of view onto the tracking CCD sensor.

19. The method of claim 18 further comprising the step of generating with a computer position signals from input video signals developed by the tracking CCD in response to light energy from the star and applying said position signals to the drive system to make corrections to the relative position of the telescope to the star to maintain optical alignment of the imaging CCD with the object in the field of view of the telescope.

20. The method of claim 19 wherein the CCD camera includes a thermoelectric cooler operatively connected to and adapted to cool the pedestal, tracking CCD and imaging CCD further comprising the step of cooling tracking CCD and imaging CCD to improve the signal-to-noise ratio of the video signals developed therefrom.

21. The method of claim 19 further comprising the step of generating with the computer an electronic image of the object in the field of view from input video signals developed by the imaging CCD in response to light energy of an object in the field of view.

22. The method of claim 21 further comprising the step of processing the electronic image with an image processing program.

23. The method of claim 22 further comprising the step of generating a visual image of the processed electronic image.

24. The method of claim 21 further comprising the step of storing in a memory the electronic image of the object in the field of view.

25. The method of claim 24 further comprising the step of processing the stored electronic image with an image processing program.

26. The method of claim 25 further comprising the step of storing in the memory the processed electronic image.

27. A tracking and imaging system for a telescope having a drive system comprising an optical head comprising a housing;

a first sensor located in said housing for imaging an object in a field of view;

a second sensor located in said housing for tracking a star off axis to the field of view of said first sensor, said second sensor being rigidly supported and positioned a predetermined distance from and adjacent to said first sensor;

cooling means for cooling said first sensor and said second sensor at a predetermined temperature so as to minimize the generation of a dark current in said first sensor and said second sensor; and a host computer operatively connected to said optical head and said drive system for receiving input signals from each of said first sensor and said second sensor to store as electronic data an electronic image of the object from the field of view of the telescope and to generate position signals representative of changes in position between the telescope and the object in the field of view, said host computer being adapted to apply the position signal to the drive system of the telescope to maintain optical alignment between the telescope and the object in the field of view.

28. An optical head comprising a first sensor for imaging the object in a field of view;

a second sensor for tracking a star off axis to an object in the field of view, said second sensor being rigidly supported and positioned a selected distance from and adjacent to said first sensor and positioned relative to said first sensor to have the tracking star substantially focused thereon; and a beam splitter positioned relative to said first sensor and said second sensor to pass a selected portion of light energy from an object in a field of view to the first sensor and to reflect substantially all of the remaining light energy to said second sensor;

said second sensor being adapted to generate signals for a drive system representative of changes in relative positions of a platform to a star being tracked to maintain optical alignment of the first sensor with an object in the field of view as corrections are made by a drive system to position of a platform.

29. The optical head of claim 28 wherein the beam splitter reflects less than about 50% of the light energy to the second sensor.

30. The optical head of claim 28 wherein the beam splitter transmits the light energy consisting of red, green, and blue wavelengths to the first senor and the near infrared light energy wavelengths to the second sensor.

* * * * *